(12) United States Patent
Wu et al.

(10) Patent No.: US 11,704,486 B2
(45) Date of Patent: Jul. 18, 2023

(54) ABSTRACT MEANING REPRESENTATION PARSING WITH GRAPH TRANSLATION

(71) Applicants: INTERNATIONAL BUSINESS MACHINES CORPORATION, Armonk, NY (US); THE BOARD OF TRUSTEES OF THE UNIVERSITY OF ILLINOIS, Urbana, IL (US)

(72) Inventors: Lingfei Wu, Elmsford, NY (US); Jinjun Xiong, Goldens Bridge, NY (US); Hongyu Gong, Champaign, IL (US); Suma Bhat, Champaign, IL (US); Wen-Mei Hwu, Champaign, IL (US)

(73) Assignees: INTERNATIONAL BUSINESS MACHINES CORPORATION, Armonk, NY (US); THE BOARD OF TRUSTEES OF THE UNIVERSITY OF ILLINOIS, Urbana, IL (US)

( * ) Notice: Subject to any disclaimer, the term of this patent is extended or adjusted under 35 U.S.C. 154(b) by 202 days.

(21) Appl. No.: 17/109,008

(22) Filed: Dec. 1, 2020

(65) Prior Publication Data
US 2022/0171923 A1 Jun. 2, 2022

(51) Int. Cl.
*G06F 40/211* (2020.01)
*G06N 3/08* (2023.01)
(Continued)

(52) U.S. Cl.
CPC ........ *G06F 40/211* (2020.01); *G06F 18/2155* (2023.01); *G06N 3/045* (2023.01); *G06N 3/08* (2013.01); *G06N 7/01* (2023.01)

(58) Field of Classification Search
CPC .. G06F 40/211; G06K 9/6259; G06N 3/0454; G06N 3/08; G06N 7/005
See application file for complete search history.

(56) References Cited

U.S. PATENT DOCUMENTS 7,962,861 B2 6/2011 Erwin et al.
8,260,614 B1 9/2012 Zhao et al.
(Continued)

OTHER PUBLICATIONS

Mell, P. et al., "Recommendations of the National Institute of Standards and Technology"; NIST Special Publication 800-145 (2011); 7 pgs.
(Continued)

*Primary Examiner* — Bhavesh M Mehta
*Assistant Examiner* — Edward Tracy, Jr.
(74) *Attorney, Agent, or Firm* — Intelletek Law Group, PLLC; Gabriel Daniel, Esq.

(57) ABSTRACT

A computer-implemented method for generating an abstract meaning representation ("AMR") of a sentence, comprising receiving, by a computing device, an input sentence and parsing the input sentence into one or more syntactic and/or semantic graphs. An input graph including a node set and an edge set is formed from the one or more syntactic and/or semantic graphs. Node representations are generated by natural language processing. The input graph is provided to a first neural network to provide an output graph having learned node representations aligned with the node representations in the input graph. The method further includes predicting via a second neural network, node label and predicting, via a third neural network, edge labels in the output graph. The AMR is generated based on the predicted node labels and predicted edge labels. A system and a non-transitory computer readable storage medium are also disclosed.

17 Claims, 12 Drawing Sheets

(51) Int. Cl.
*G06F 18/214* (2023.01)
*G06N 3/045* (2023.01)
*G06N 7/01* (2023.01)

(56) References Cited

U.S. PATENT DOCUMENTS

| | | |
|---|---|---|
| 10,169,454 B2 | 1/2019 | Ait-Mokhtar et al. |
| 2018/0197104 A1 | 7/2018 | Marin et al. |
| 2018/0197107 A1 | 7/2018 | Belous |
| 2020/0026770 A1* | 1/2020 | Li .................. G06F 16/24578 |
| 2020/0394499 A1* | 12/2020 | Yao ..................... G06N 3/0454 |
| 2021/0216861 A1* | 7/2021 | Bandyopadhyay ...... G06N 3/08 |
| 2021/0375273 A1* | 12/2021 | Fancellu ................. G06F 40/30 |
| 2022/0121815 A1* | 4/2022 | Gruenewald ......... G06F 40/284 |

OTHER PUBLICATIONS

Werling, K. et al., "Robust Subgraph Generation Improves Abstract Meaning Representation"; arXiv:1506.03139v1 [cs.CL] (2015); 10 pgs.
Cai, D. et al., "Core Semantic First: A Top-down Approach for AMR Parsing"; arXiv:1909.04303v2 [cs.CL] (2019); 12 pgs.
Lyu, C. et al., "AMR Parsing as Graph Prediction with Latent Alignment"; Proceedings of the 56th Annual Meeting of the Association for Computational Linguistics (Long Papers—2018); pp. 397-407.
Zhang, S. et al., "AMR Parsing as Sequence-to-Graph Transduction"; Proceedings of the 57th Annual Meeting of the Association for Computational Linguistics (2019); pp. 80-94.

\* cited by examiner

ABSTRACT MEANING REPRESENTATION PARSING WITH GRAPH TRANSLATION

BACKGROUND

Technical Field

The present disclosure generally relates to abstract meaning representation, and more particularly, automatically generated abstract meaning representation graphs having increased semantic and syntactic information.

Description of the Related Art

Abstract meaning representation ("AMR") is a popular language processing technique. AMR parsing encodes rich semantic and syntactic knowledge (word relations). AMR training requires data with labeled semantic and syntactic data. Labeled data, however, is limited. One example of labeled data is annotated data. Annotated data, however, is labor intensive and expensive.

A probabilistic model of node and edge prediction that models the alignment between words in sentences and nodes in AMR graphs as latent variables is described in Lyu C, Titov I, "AMR Parsing as Graph Prediction with Latent Alignment," In Proceedings of the 56th Annual Meeting of the Association for Computational Linguistics (Volume 1: Long Papers) 2018 July (pp. 397-407). A neural parser treats the latent variables within a joint probabilistic model of concepts, relations and alignments. Variational autoencoding framework and a continuous relaxation of the discrete alignments are also used.

Restructuring an AMR graph as a tree, where tree nodes and edges are predicted from a sentence is described in Zhang S, Ma X, Duh K, Van Durme B, "AMR Parsing as Sequence-to-Graph Transduction, "Proceedings of the 57th Annual Meeting of the Association for Computational Linguistics," 2019 July (pp. 80-94). An attention-based model treats AMR parsing as sequence-to-graph transduction. The parser is aligner-free.

SUMMARY

A computer-implemented method of generating an abstract meaning representation of a sentence includes a computing device receiving an input sentence and parsing the input sentence into one or more syntactic and/or semantic graphs. An input graph is formed from the one or more syntactic and/or semantic graphs. The input graph has nodes corresponding to words in the one or more input sentences and edges between nodes from the one or more syntactic graphs. Node representations are generated of the words in the nodes by natural language processing. Learned node representations aligned with the node representations in the input graph are predicted based on the generated node representations and the edge set, via a first neural network. The method further predicts, by the computing device, node labels in the output graph via a second neural network, based on the learned node representations. In addition, the method predicts, by the computing device, edge labels in the output graph, via a third neural network, based on the learned node representations. The abstract meaning representation graph of the input sentence is generated with nodes having node labels based on the predicted node labels and edges between nodes based on the predicted edge labels.

The one or more syntactic and/or semantic graphs may be a constituency graph and a dependency graph, and the method may further comprise merging the constituency graph and the dependency graph in the node set and the edge set. The node labels may be predicted by determining, based on the learned representation, whether to copy a lemma from a set of lemmas or to generate the abstract concept from a concept library based on a probability to copy a lemma and the probability to generate the abstract idea, by the second neural network, and predicting the lemma to copy or the abstract idea to generate based on the lemma in the set of lemmas or the abstract concept from the concept vocabulary that has the highest probability of being the predicted node label, by the second neural network. An edge label may be predicted by the third neural network by predicting whether an edge exists between the pair of nodes, and if an edge is predicted to exist between the pair of nodes, classifying an edge label from a set of edge labels having a highest probability of being the edge label for the edge. The input sentence may be received from a second computing device and the generated abstract meaning relation graph may be provided to the second computing device. The method may further comprise training the first, second, and third neural networks by providing an input sentence corresponding to a respective AMR graph in a training set to the input parser, aligning nodes in the output graph with nodes in the abstract meaning representation graph of a training set, comparing provided AMR graphs with predicted AMR graphs, and updating parameters in the first neural network, the second neural network, and the third neural network to minimize training loss.

A computing device comprises a processing device, a network interface coupled to the processing device to enable communication over a network, and a storage device coupled to the processing device. Abstract meaning relationship graphing code is stored in the storage device. Execution of the code by the processing device causes the computing device to parse an input sentence into one or more syntactic and/or semantic graphs. An input graph having a node set including words in the one or more input sentences and an edge set including connections between words from the one or more syntactic and/or semantic graphs is formed from the one or more syntactic and/or semantic graphs. Node representations of the words in the node set are generated by natural language processing. Execution of the code further causes the processing device to predict learned node representations aligned with the node representations in the input graph based on the generated node representations and the edge set, via a first neural network. Execution of the code further causes the processing device to predict, by the computing device, node labels in the output graph, via a second neural network, based on the learned node representations, and predict, by the computing device, edge labels in the output graph, via a third neural network, based on the learned node representations. Execution of the code further causes the processing device to generate the abstract meaning representation graph of the input sentence, where the abstract meaning representation graph has nodes with node labels based on the predicted node labels and edges between nodes based on the predicted edge labels.

The one or more syntactic and/or semantic graphs may be a constituency graph and a dependency graph, and the abstract meaning relationship graphing code may further cause the computing device to merge the constituency graph and the dependency graph in the node set and the edge set. The abstract meaning relationship graphing code may further cause the computing device to predict node labels in the output graph by determining, based on the learned representation, whether to copy a lemma from a set of lemmas or to generate an abstract concept from a concept library based on a probability to copy a lemma and the probability to generate the abstract idea, by the second neural network, and predicting the lemma to copy or the abstract idea to generate based on the lemma in the set of lemmas or the abstract concept from the concept vocabulary that has the highest probability of being the predicted node label, by the second neural network. The abstract meaning relationship graphing code may further cause the computing device to predict an edge label by the third neural network by predicting whether an edge exists between the pair of nodes, and if an edge is predicted to exist between the pair of nodes, classifying an edge label from a set of edge labels having a highest probability of being the edge label for the edge. The input sentence may be received from a second computing device and the abstract meaning relationship graphing code may further cause the computing device to provide the generated abstract meaning relation graph to the second computing device. The abstract meaning relationship graphing code may further cause the computing device to train the first, second, and third neural networks by providing an input sentence corresponding to a respective AMR graph in a training set to the input parser, aligning nodes in the output graph with nodes in the abstract meaning representation graph of a training set, comparing the provided abstract meaning representation graph with the predicted abstract meaning representation graph, and updating parameters in the first neural network, the second neural network, and the third neural network to minimize training loss.

A non-transitory computer readable storage medium tangibly embodying a computer readable program code has computer readable instructions that, when executed, causes a computing device to generate an abstract meaning relationship graph from an input sentence by parsing, by the computing device, the input sentence into one or more syntactic and/or semantic graphs, and forming an input graph from the one or more syntactic and/or semantic graphs. The input graph includes a node set including words in the one or more input sentences and an edge set including connections between words from the one or more syntactic and/or semantic graphs. Execution of the code causes the computing device to generate node representations of the words in the node set by natural language processing. Execution of the code further causes the computing device to predict learned node representations aligned with the node representations in the input graph based on the generated node representations and the edge set, via a first neural network. Execution of the code further causes the computing device to predict node labels in the output graph, via a second neural network, and to predict edge labels in the output graph, via a third neural network, based on the learned node representations. Execution of the code further causes the computing device to generate the abstract meaning representation graph of the input sentence having nodes with node labels based on the predicted node labels and edges between nodes based on the predicted edge labels.

The one or more syntactic and/or semantic graphs may be a constituency graph and a dependency graph, and the computer readable instructions, when executed, may further causes the computing device to merge the constituency graph and the dependency graph in the node set and the edge set. The computer readable instructions, when executed, may further cause the computing device to predict node labels in the output graph by determining, based on the learned representation, whether to copy a lemma from a set of lemmas or to generate the abstract concept from a concept library based on a probability to copy a lemma and the probability to generate the abstract idea, by the second neural network, and predicting the lemma to copy or the abstract idea to generate based on the lemma in the set of lemmas or the abstract concept form the concept vocabulary that has the highest probability of being the predicted node label, by the second neural network. The computer readable instructions, when executed, may further cause the computing device to predict an edge label by the third neural network by predicting whether an edge exists between the pair of nodes, and if an edge is predicted to exist between the pair of nodes, classifying an edge label from a set of edge labels having a highest probability of the edge label for the edge. The input sentence may be provided by a second computing device and the computer readable instructions, when executed, may further cause the computing device to provide the generated abstract meaning relation graph to the second computing device.

By virtue of the teachings herein, AMR graphs are automatically generated with increased semantic and syntactic information, including abstract concepts. The AMR graphs may be used by chatbot systems, dialogue systems, automatic summarization systems, machine translation, and language understanding and inference, for example, which may provide input sentences upon which an AMR graph is based and then receive the AMR graph for use. By training the first, second, and third neural networks in a single training model, AMR graph generation is more consistent.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

DETAILED DESCRIPTION

Overview

In the following detailed description, numerous specific details are set forth by way of examples to provide a thorough understanding of the relevant teachings. However, it should be apparent that the present teachings may be practiced without such details. In other instances, well-known methods, procedures, components, and/or circuitry have been described at a relatively high-level, without detail, to avoid unnecessarily obscuring aspects of the present teachings.

The present disclosure relates to systems and methods of automatically generating abstract meaning representational graphs from input sentences, without human intervention. In accordance with embodiments, input sentences are parsed by an input parser to form a syntactic and/or semantic input graph. If the input sentence is parsed into multiple input graphs, the input graphs are combined to form a single input graph. A node set may be created from the words in the input sentence and an edge set may be created from connected words in the syntactic and/or semantic input graphs. Node representations of the words in the nodes may be generated by one or more natural language processing ("NLP") techniques. The input graph is translated into an output graph with learned node representations by a neural network of a graph2graph translation model. The neural network may be a graph neural network, for example. The output of the neural network has an intermediate AMR graph structure. A node classifier predicts whether a node should be copied from a set of input lemmas or an abstract concept should be generated from a concept library, via one or more neural network. An edge classifier determines whether and edge exists between two nodes and the edge label to be assigned to the edge, also via one or more neural networks.

Use of computer implemented systems and computing devices in accordance with embodiments of the disclosure enables generation of AMR graphs that have increased semantic and syntactic information, including abstract concepts. Such AMR graphs are useable by other computer implemented systems and computing devices, such as chatbot systems, dialogue systems, automatic summarization systems, machine translation, and language understanding and inference, for example. In chatbot and dialogue systems, for example, AMR graphs automatically generated in accordance with embodiments of the disclosure may be generated fast enough to assist the chatbot/dialogue system in automatically responding to statements provided by a person with a relevant response. This can decrease the amount of human intervention required in such systems, as well as improve customer service.

The techniques described herein may be implemented in a number of ways. Example implementations are provided below with reference to the following figures.

Figure 1:
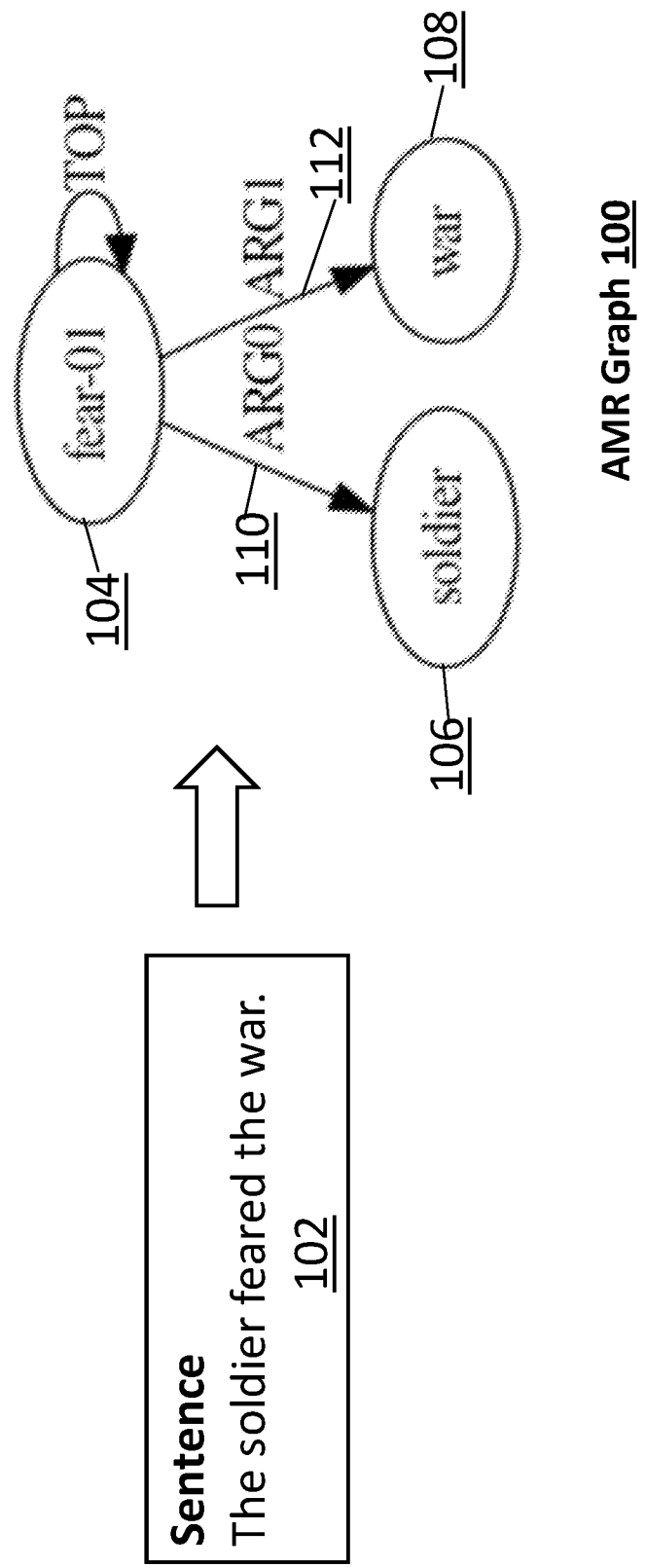
FIG. 1 is an example of an AMR graph resulting from parsing of an exemplary sentence.

FIG. 1 is an example of an AMR graph 100 resulting from parsing of the sentence 102 "The soldier feared the war." The AMR graph 100 includes a root or top node 104, which in this example, is labeled "fear-01," as the meaning of fear corresponds to a first of multiple definitions in a dictionary, for example. Two nodes 106, 108 depend from the top node 104. The node 106 in this example contains the word "soldier" and the node 108 in this example contains the word "war." The top node 104 and the node 106 are connected by a first edge 110. The top node 104 is connected to the node 110 by a second edge 112. In this example, "fear" is a verb relating "soldier" to "war." Soldier is the subject of the verb fear while war is the object of the verb fear. Since the verb fear relates to both the soldier and war nodes, it is the root node and is labeled "TOP." The first edge 110 is labelled ARG0, which corresponds to a subject of the sentence, and the second edge 112 is labelled ARG1, which corresponds to an object of the sentence. A table may correlate the nodes 104, 106, 108 with the edges 110, 112 and the meaning of the edge labels ARG0, ARG1 and other labels. This AMR graph is a directed graph whose nodes only include the words or lemmas from the sentence, without abstract concepts and therefore provides limited information.

AMR Generation Environment

Figure 2:
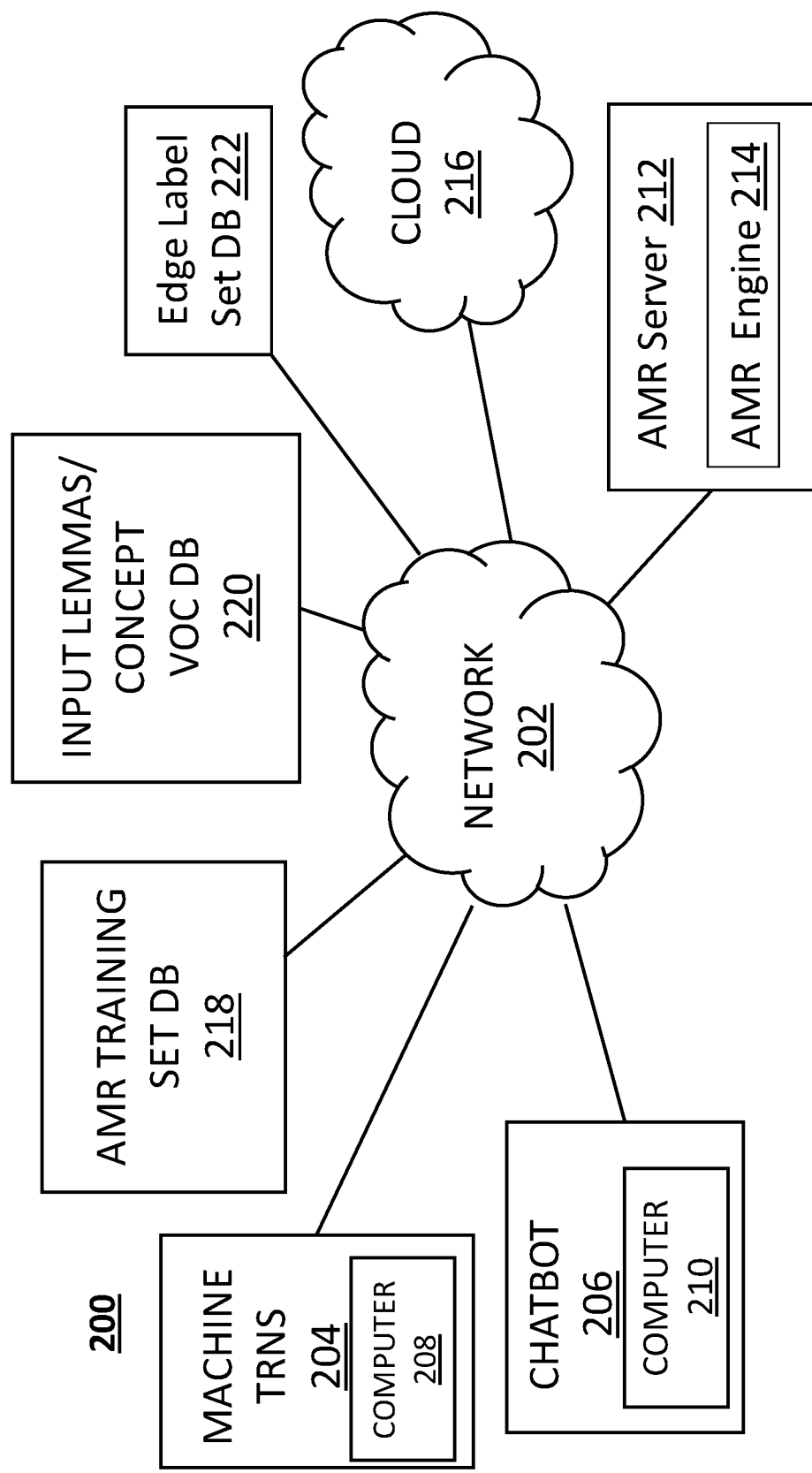
FIG. 2 is an example of an AMR generation environment for generating AMR graphs, in accordance with an illustrative embodiment.

FIG. 2 is an example AMR generation environment 200 for generating AMR graphs with graph translation, in accordance with an embodiment of the disclosure. The AMR generation system 200 includes a network 202 that allows various systems, such as systems 204 to 206, to communicate with other elements that are connected to the network 202. In this example, one of the systems 204 is a machine translation system including a computer 208. The second system 206 is a chatbot system, which includes a computer 210. Other examples of systems that may be part of the AMR generation environment 200 include dialogue systems, automatic summarization systems, and language understanding and inference systems, for example. Such systems may provide input sentences to the AMR generation environment 200 and receive AMR graphs based on the respective input sentences, as discussed herein.

Other components of the AMR generation system 200 include an AMR server 212 that includes an AMR engine 214 that performs AMR parsing with graph translation to generate AMR graphs from input sentences. The AMR engine 214, which is a software program running on the AMR server 212, communicates with other components of the AMR generation system 200 via the network 202. In this example, input sentences are provided from the machine translation system 204 and the chatbot 206, via the network 202. AMR graphs generated by the AMR engine 212 based on the input sentences are returned to the respective system that provided the input sentence, via the network 202. In one embodiment, the data processing is performed, at least in part, on the cloud 216, which also communicates with other components of the system 200 via the network 202.

Other components of the AMR generation system 200 include an AMR training set database 218 that provides data to the AMR engine 214 to train the neural networks used by the AMR engine. An input lemma/concept vocabulary database 220 is also provided. The input lemma/concept vocabulary database 220 provides data used by an AMR node classifier to assign either lemmas or abstract concepts to respective nodes, as discussed further below. In addition, an edge set label database 222 is provided, which includes a set of labels that can be assigned to edges between nodes. Examples of edge labels include grammatical terms that define the relationship between the words in connected nodes, such as noun, verb, subject, object, etc. The input lemma/concept vocabulary database 218 could be two separate databases. In addition, any two or more of the databases 218, 220, 222 may be combined into a single database.

The network 202 may be, without limitation, a local area network ("LAN"), a virtual private network ("VPN"), a cellular network, the Internet, or a combination thereof. For example, the network 202 may include a mobile network that is communicatively coupled to a private network, sometimes referred to as an intranet that provides various ancillary services, such as communication with various libraries, and the Internet, for example.

While the AMR training set database 218, the input lemmas/concept vocabulary database 220, the edge label set database 222, and the AMR engine 214 are shown by way of example to be on different platforms, it will be understood that in various embodiments, the AMR engine may be combined with the AMR training set database, the input lemmas/concept vocabulary database, and/or the edge label set database 222. In other embodiments, the components of the AMR generation system 200 may be implemented by virtual computing devices in the form of virtual machines or software containers that are hosted in a cloud 216, thereby providing an elastic architecture for processing and storage.

Example AMR Generation System

FIGS. 3-9 are examples of systems and processes implemented by the systems, in accordance with embodiments of the disclosure. It will be understood that each block of the flowchart illustrations and/or block diagrams, and combinations of blocks in the call flow illustrations and/or block diagrams, can be implemented in hardware, software, or a combination thereof. In the context of software, the processes represent computer-executable instructions that, when executed by one or more processors, perform the recited operations. Generally, computer-executable instructions may include routines, programs, objects, components, data structures, and the like that perform functions or implement abstract data types. The order in which the operations are described is not intended to be construed as a limitation, and any number of the described processes can be combined in any order and/or performed in parallel to implement the process.

Figure 3:
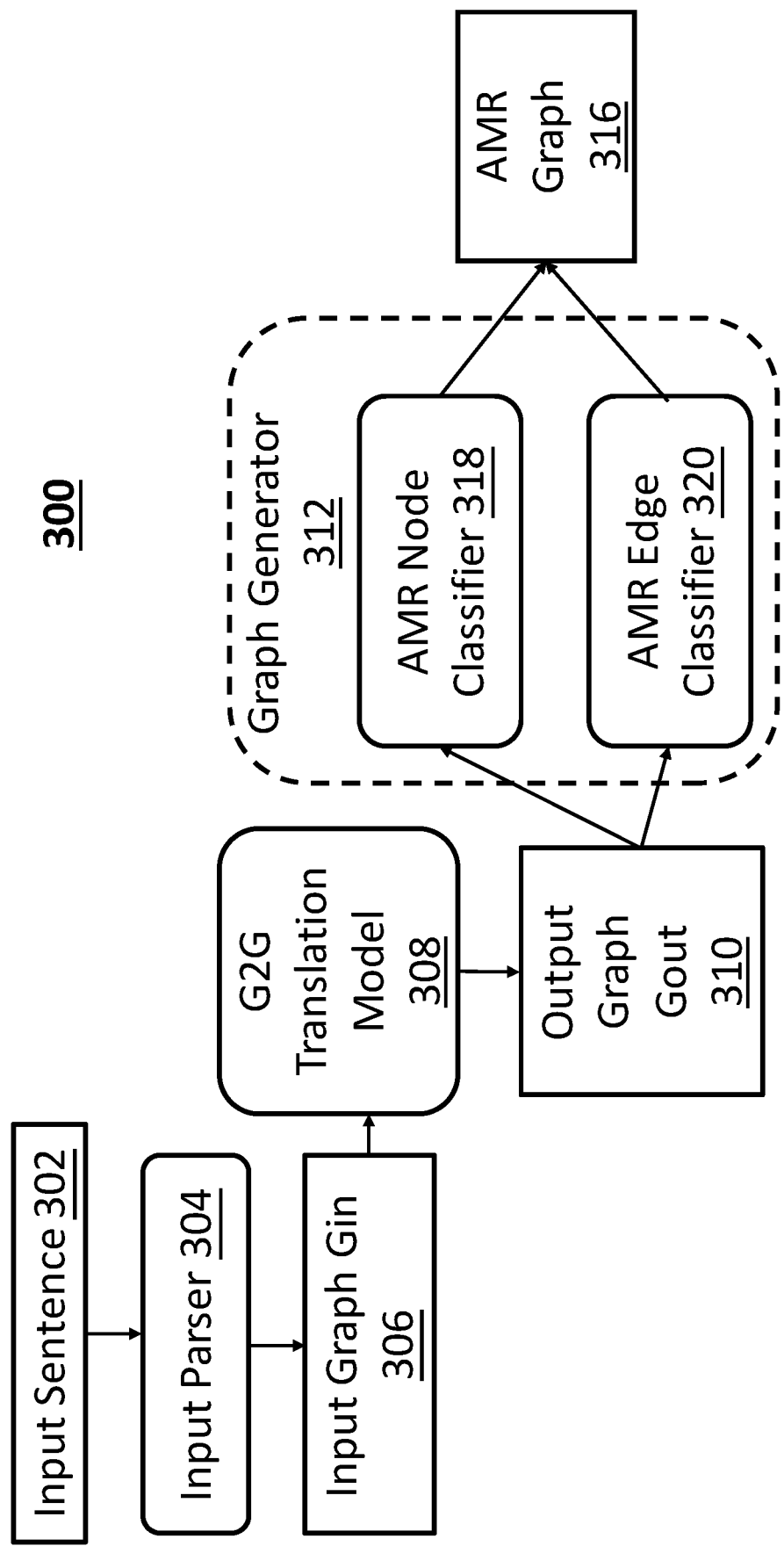
FIG. 3 is a block diagram of the AMR generation system for generating AMR graphs from input sentences, in accordance with an illustrative embodiment.

FIG. 3 is a block diagram of the AMR generation system 300 for generating AMR graphs from input sentences in accordance with an illustrative embodiment. An input sentence 302 is provided to an input parser 304, which constructs an input graph Gin 306. The input sentence 302 is parsed into one or more syntactic and/or semantic graphs, such as a constituency graph and/or a dependency graph, for example. Nodes and edges in the one or more syntactic and/or semantic graphs are identified. Nodes include respective words in the one or more syntactic/semantic graphs and edges between nodes are connections between the words in the one or more syntactic/semantic graphs. The edges between nodes include syntactic information and the nodes include semantic information. A node set is created including the nodes in the one or more syntactic/semantic graphs and an edge set is created including the edges between the nodes. Node representations are generated by one or more natural language processing techniques, for example, as discussed further below. A node representation set and the edge set are referred to collectively as the "input graph Gin 306."

The input graph Gin 306 is provided to the graph2graph translation model 308. The graph2graph translation model 308 translates the input graph Gin 306 into an output graph Gout 310 with learned node representations or embeddings based on the node representations in the node set. The graph2graph translation model 308 includes a neural network, such as a graph neural network, for example. The learned node representations include further semantic and syntactic information including abstract meanings, based on the node representation set and the edge set.

The graph2graph translation model 308 provides an output graph Gout 310 with graph embeddings to the graph generator 312, which generates the AMR graph 316. The graph generator 312 includes a node classifier 318 and an edge classifier 320. The node classifier 318 determines, via a neural network, whether a node should include a lemma copied from a set of input lemmas or an abstract concept from a concept library. The abstract concept adds further semantic information to the AMR graph 316. The edge classifier 320 determines, via a neural network, whether an edge should exist between two nodes and if so, the label of the edge. The generated AMR graph 316 may be provided to the system providing the input sentence 302, such as the machine translation system 204 and the chatbot system 206 in FIG. 2, for example.

Figure 4:
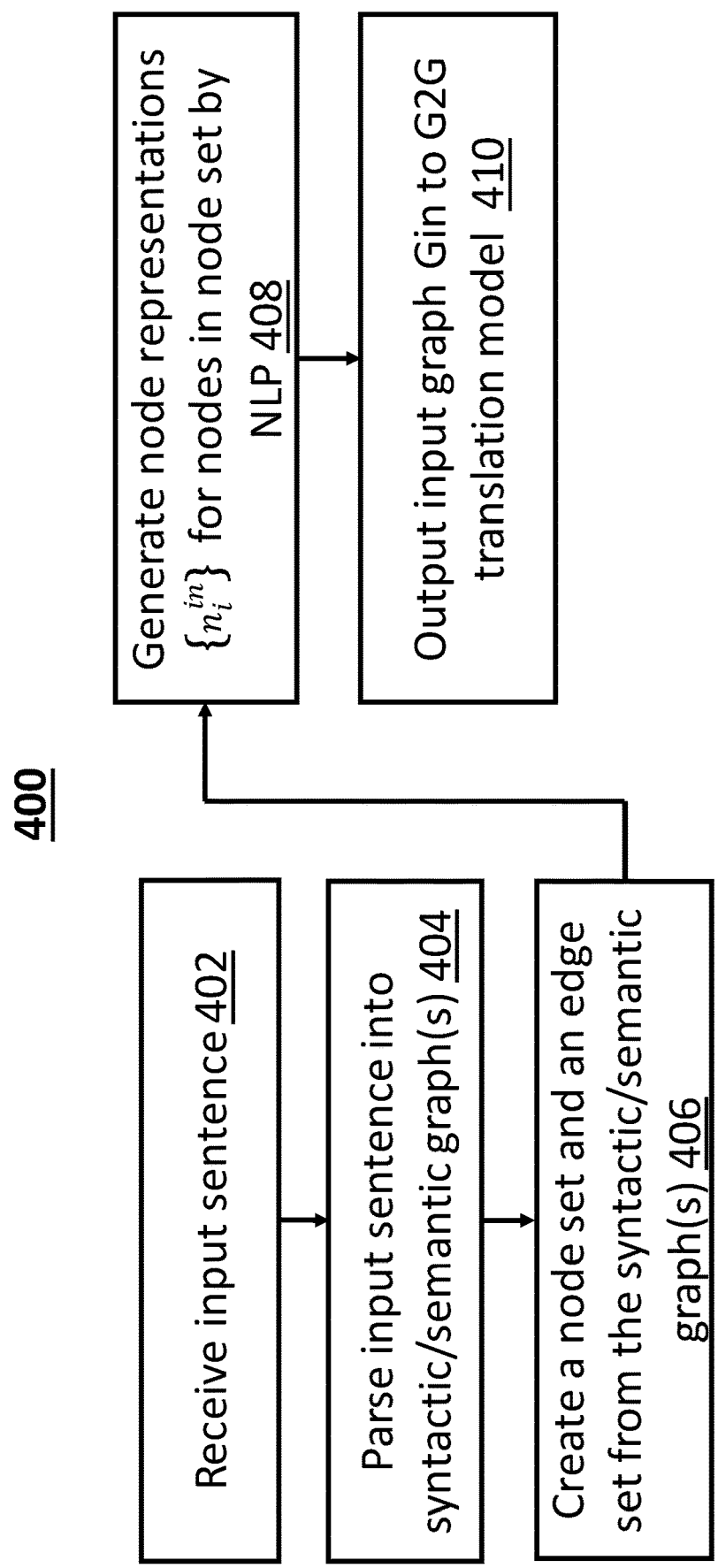
FIG. 4 is a flow chart of an example of the operation of an input parser, in accordance with an embodiment.

FIG. 4 is a flow chart 400 of an example of the operation of the input parser 304 of FIG. 3. An input sentence is received by the input parser, in block 402. The input sentence is parsed by the input parser into one or more syntactic and/or semantic graphs, such as a constituent graph and/or a dependency graph, for example, in block 404. A constituent graph may be in the form of a tree that encodes words and phrases in their syntactic relations. A dependency graph organizes the syntactic structure of a sentence in terms of the words in the sentence and their grammatical relations, such as subject, object, and verb in a sentence, for example. In addition to or instead of a constituent graph and/or a dependency graph, the input graph Gin may be a natural language processing parsing graph, a categorical grammar graph, and/or a semantic role labeling graph, for example.

A node set and an edge set are created from the one or more syntactic/semantic graphs, in block 406. The node set includes words from the input sentence. The edge set includes is provided edges between two words that are connected in the one or more syntactic/semantic graphs. The edge set may be in the form of an adjacency matrix. Semantic information is provided by the nodes while syntactic information is provided by the edges. If the input sentence is parsed into more than one syntactic/semantic graph, the nodes and edges of the syntactic/semantic graphs are merged into a single node set and a single edge set, in block 408.

Node representations $\{n_i^{in}\}$, which are vector representations of the nodes, are generated for each node in the node set using one or more natural language processing ("NLP") techniques, in block 408. The NLP techniques may include word embedding techniques, such as token embedding from a pretrained Robustly Optimized Bert Training Approach (RoBERTa-Large model), word embedding via Global Vectors ("GloVe") model for distributed word representations, and/or part of speech embedding. RoBERTa is based on sequences of words in the input sentence. GloVe and part of speech embedding are based on the words themselves. If two or more NLP techniques are used, the node representation $\{n_i^{in}\}$ may be based on a concatenation of the two or more embedding techniques, for example. A node representation set and the edge set (referred to as an input graph Gin), are output to the graph2graph translation model 308 of FIG. 3, in block 410.

Figure 5:
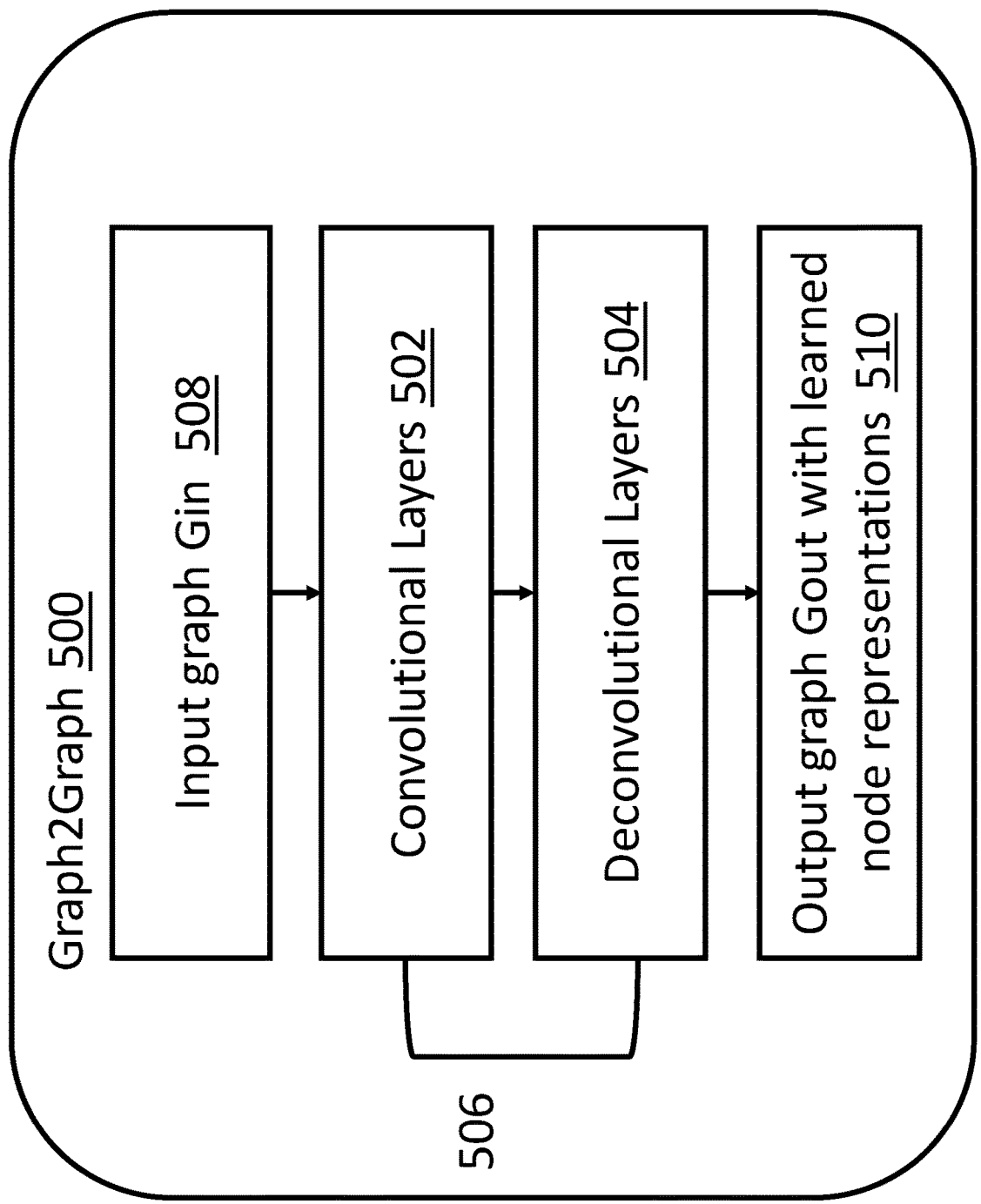
FIG. 5 is a schematic representation of an example of a neural network architecture of a graph2graph translation model, in accordance with an embodiment.

FIG. 5 is a block diagram of an example of a graph2graph translation model 500, which corresponds to the graph2graph translation model 308 of FIG. 3. In this example, convolution layers 502 and de-convolution layers 504 together form a graph neural network 506 that translates the input graph Gin provided from the input parser in block 508 into an output graph Gout, in block 510. Other types of neural networks, including other graph neural networks with other configurations, may be used.

The input graph Gin from the input parser 304 of FIG. 3, including the adjacency matrix containing the edge set and the node representation set containing node representations, is provided to the convolution layers, in block 508. The output of the convolution layers 502 is provided to the de-convolution layers 504. The graph neural network 506 translates the input graph Gin with its adjacency matrix and node representations $\{n_i^{in}\}$ into an intermediate version of an AMR graph with node representations $\{n_k^{out}\}$ based on learned representations of nodes that were learned during training. The nodes in Gout are aligned with the nodes in Gin. The learned representations include further semantic and syntactic information from both the node representation set and the edge set, resulting from the computations in the convolution layers 502 and the de-convolution layers 504.

Training

Figure 6:
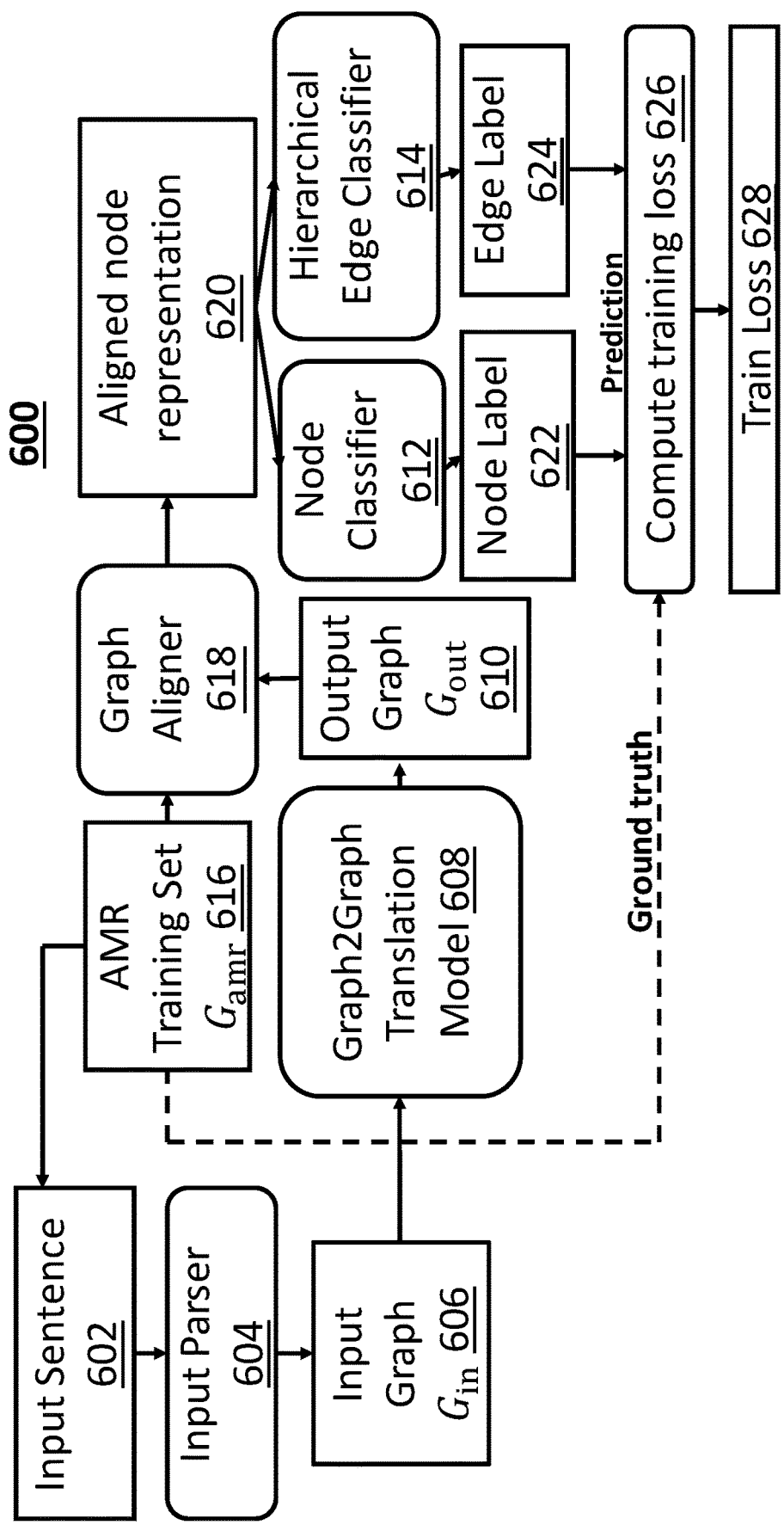
FIG. 6 is a block diagram of an example of the AMR generation system including training components for training an AMR generation system, in accordance with an embodiment.

The nodes of the output graph Gout are not necessarily aligned with the nodes of the AMR graph being constructed. In other words, the i-th node of the Gout does not necessarily correspond to the i-th node of the AMR graph. To find the mapping of nodes between the output graph Gout and the AMR graph Gamr, a graph aligner is provided during training. FIG. 6 is a block diagram of an example of training model 600 including the AMR generation system 300 of FIG. 3, with training components. In addition to the components and input/output data in the block diagram of FIG. 3, which are numbered 602-614 in FIG. 6, an AMR graph training set Gamr 616 and a graph aligner 618 are shown. The AMR graph training set provides an AMR graph to the graph aligner 618 and a corresponding input sentence 602 to the input parser 604, that act as ground truths for training. The input sentence 602 is processed by the input parser 604 to generate an input graph Gin 606, as discussed above with respect to FIG. 3. The input graph Gin 606 is provided to the graph2graph translation model 608, which generates an output graph Gout 610, as is also discussed above with respect to FIGS. 3 and 5. The output graph Gout 610 is also provided to the graph aligner 618. During training, the graph aligner 618 uses the learned node representation from the graph2graph translation model 608 to predict aligned node representations 620.

Node representations for the AMR graph Gamr from the training set are prepared. An embedding $v_j$ of the j-the node may be determined by performing NLP, such as GloVe word embedding and/or part-of-speech embedding, corresponding to how the node representation was prepared by the input parser 614. If two or more NLP techniques are used, the embedding $v_j$ is a concatenation of the two or more techniques.

Nodes in Gamr are aligned with nodes in Gout by predicting an AMR label Gamr for each node of the AMR graph Gamr having a representation $\{n_i^{out}\}$ from Gout. An alignment probability for a node j in Gamr is calculated for each node i in Gout by calculating an alignment score $s_j^{align}(i)$. The alignment score $s_j^{align}(i)$ may be calculated based on the Equation 1, for example:

$$s_j^{align}(i) = u_{align}^T(P_{amr}v_j + P_{out}n_i^{out} + b_{align}).\qquad\text{(Eqn. 1)}$$

In Equation 1, $P_{amr}$ and $P_{out}$ are projection matrices for output nodes in Gamr and Gout, respectively, while $u_{align}$ and $b_{align}$ are trainable parameter vectors.

The probability that an AMR node $p_j^{align}$ in Gamr is aligned with an output node i in Gout may be estimated based on the alignment score $s_j^{align}(i)$ by a softmax function performed over scores of all output graph nodes $G_{out}$, for example, as shown in Equation 2:

$$p_j^{align} = \text{softmax}(s_j^{align}(i))\qquad\text{(Eqn. 2)}$$

Given the alignment probability $p_j^{align}$, an aligned representation $n_j^{amr}$ of each AMR node j in the output graph Gout may be derived based on Equation 3, for example:

$$n_j^{amr} = \Sigma_i p_j^{align}(i)n_i^{out}.\qquad\text{(Eqn. 3)}$$

In Equation 3, $p_j^{align}(i)$ is the probability that AMR node j is aligned with an output node i of the output graph Gout; $n_j^{out}$ is the representation of a node i in the output graph $G_{out}$; and $n_j^{amr}$ is an aligned node representation 620 that is used to predict node and edge labels in generating an AMR graph during prediction, as discussed below. The node j in the AMR graph Gamr is mapped to the node i in the output graph Gout having the highest alignment probability.

The aligned node representation $n_j^{amr}$ 620 output from the graph aligner 618 is provided to the node classifier 612 and hierarchical edge classifier 614. It is noted that in FIG. 3, the AMR node classifier 318 and AMR edge classifier 318 are part of the graph generator 312. Since an AMR graph 314 is not generated during learning, the graph generator is not indicated in FIG. 6.

Example Node Classifier

Figure 7:
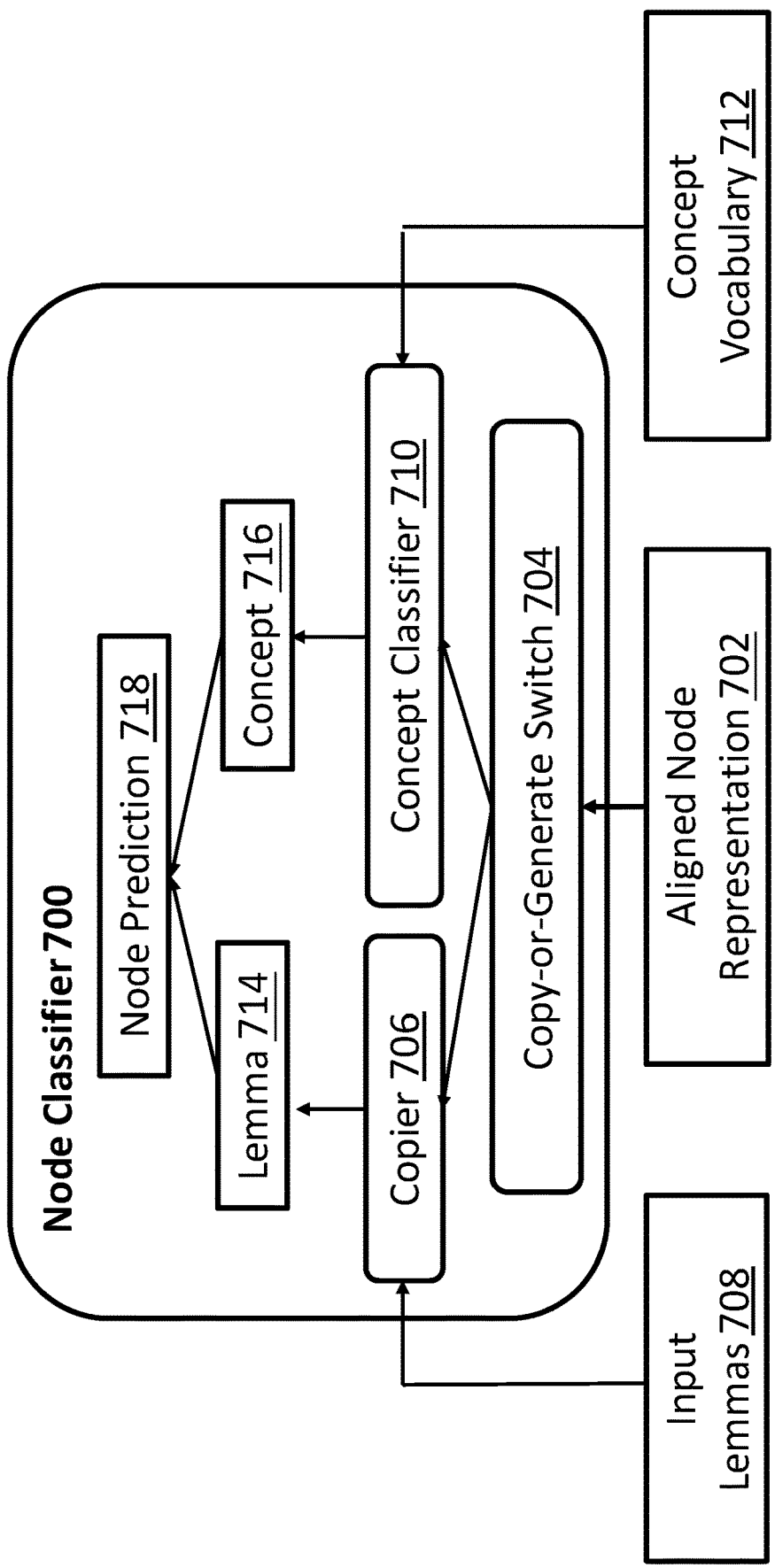
FIG. 7 is a block diagram of an example of a node classifier, in accordance with an embodiment.

FIG. 7 is a block diagram of an example of a node classifier 700, which corresponds to the node classifier 612 of FIG. 6. In this example, the node classifier 700 is a neural network. During training, an aligned node representation $n_j^{amr}$ 702 from the graph aligner 618 of FIG. 6 is provided to the node classifier 612, which classifies the node labels based on the node representation $n_j^{amr}$ derived in Equation 3, above. The aligned node representation $n_j^{amr}$ is received by a copy-or-generate switch 704, which determines whether a node label should be copied from a set of input lemmas 708 or the node label should be a concept generated by a concept classifier 712 from a concept library 710. An example of an input lemmas/concept vocabulary database 220 is shown in FIG. 2.

Copying an input lemma may involve a direct copy, such as "we" copied to "we," or it could involve copying related words, such as "finds" copied as "find," or "said" copied as "say," for example. An example of abstract concept generation from the concept vocabulary may involve generating the concept of "degree" from the word "really," and generating the concept of "recommend" from the word "should" in a sentence of the AMR graph. In another example, in the sentence He went to the UK, "he" and "went" are copied and labelled as their lemmas "he" and "went," respectively, while "UK" is labelled as the generated abstract concept of "country."

The copied lemma 714 from the input lemmas 708 or the generated abstract concept 716 from the concept vocabulary 712 becomes the node prediction 718 and is assigned to a respective node. The copy-or-generate switch 714 may be a neural network, for example.

Figure 8:
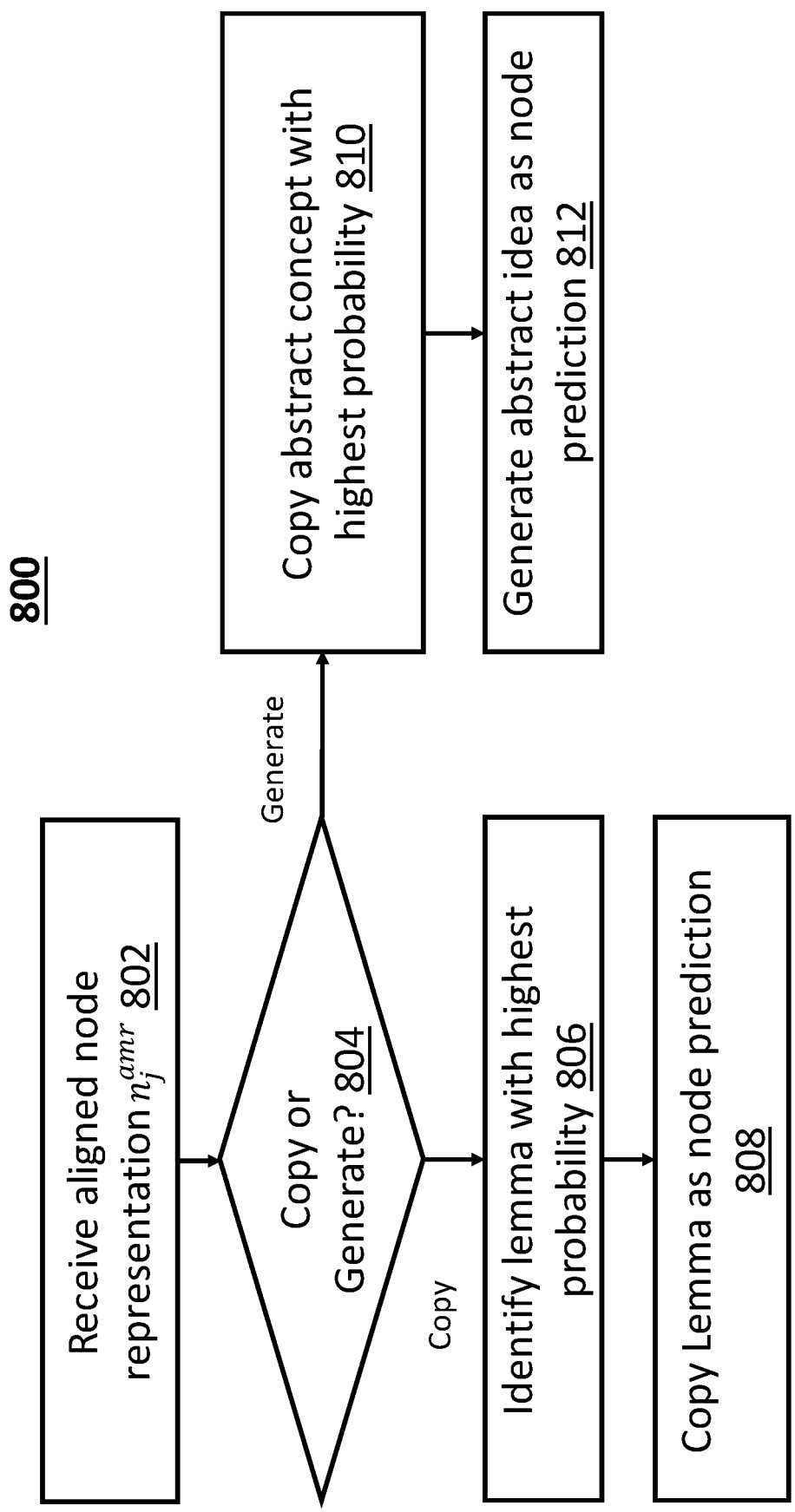
FIG. 8 is a flowchart of an example of the operation of a node classifier, in accordance with an embodiment.

FIG. 8 is a flowchart 800 of an example of the operation of the node classifier 700 of FIG. 7, in accordance with an embodiment. The aligned node representation $n_j^{amr}$ is received by the node classifier, in block 802. It is determined whether to copy an input lemma or generate an abstract idea for the node label, by the copy-or-generate processing block 707 of the node classifier 700 of FIG. 7, in block 804.

To determine whether to copy or generate, in this example, the copy-or-generate switch 704 determines which probability is higher, the probability of copying the respective node $p_j^{copy}$ or the probability of generating an abstract idea $p_j^{gen}$ based on the aligned node representation $n_j^{amr}$. Given a node j in the output graph Gout, the neural network of the copy-or-generate switch 704 determines whether to copy or generate in this example via a single-layer or multi-layer Feedforward neural network using a softmax function, such as the following softmax function, for example:

$$[p_j^{copy}, p_j^{gen}] = \text{softmax}(Qn_j^{amr} + b_{copy}). \quad \text{(Eqn. 4)}$$

In Equation 4, Q and bias vector $b_{copy}$ are trainable model parameters. It is further noted that $p_j^{copy} + p_j^{gen} = 1$.

If it is determined that the node representation should be copied in Step 804, the copier 706 of FIG. 7 determines which lemma to copy, in block 806. The copier 706 in this example determines which lemma to copy by calculating the joint copy probability that each lemma in the lemma source should be copied and selecting the lemma with the highest probability. The probability $q_j^{copy}$ that the label of node j is copied from the i-th input lemma may be determined by Equation 5, for example:

$$q_j^{copy}(i) = p_j^{copy} \cdot s_j^{align}(i). \quad \text{(Eqn. 5)}$$

In Equation 5, $q_j^{copy}(i)$ is the probability that the label of node j is copied from the input lemma (i) and $s_j^{align}(i)$ is an alignment score which was derived in Equation 1 during operation of the graph aligner 618 in FIG. 6. The lemma with the highest probability is copied as the node prediction, in block 808. The node prediction in block 808 corresponds to the node label 622 in FIG. 6.

If it is determined that an abstract concept should be generated for the node representation in block 804, the concept classifier 710 determines which abstract concept to select from the concept vocabulary 712, in block 810. The concept classifier 710 in this example determines which abstract concept to generate by calculating the probability that each concept in the concept library should be generated as the respective node label and generating the concept with the highest probability. The estimated joint probability distribution $q_j^{gen}$ of node j's label over the vocabulary of abstract concepts is determined in this example by a softmax function, for example:

$$q_j^{gen} = p_j^{gen} \cdot \text{softmax}(Wn_j^{amr} + b_{gen}) \quad \text{(Eqn. 6)}$$

In Equation 6, W is a matrix and bias vector $b_{gen}$, both of which are trainable. The probability that the node label j, $n^{amr}$, is concept c, is denoted as $q_j^{gen}(c)$, which is the c-th element in vector $q_j^{gen}$. The concept with the highest probability is generated as the node prediction, in block 812. The node prediction 812 corresponds to the node label 622 in FIG. 6.

Example Hierarchical Edge Classifier

Figure 9:
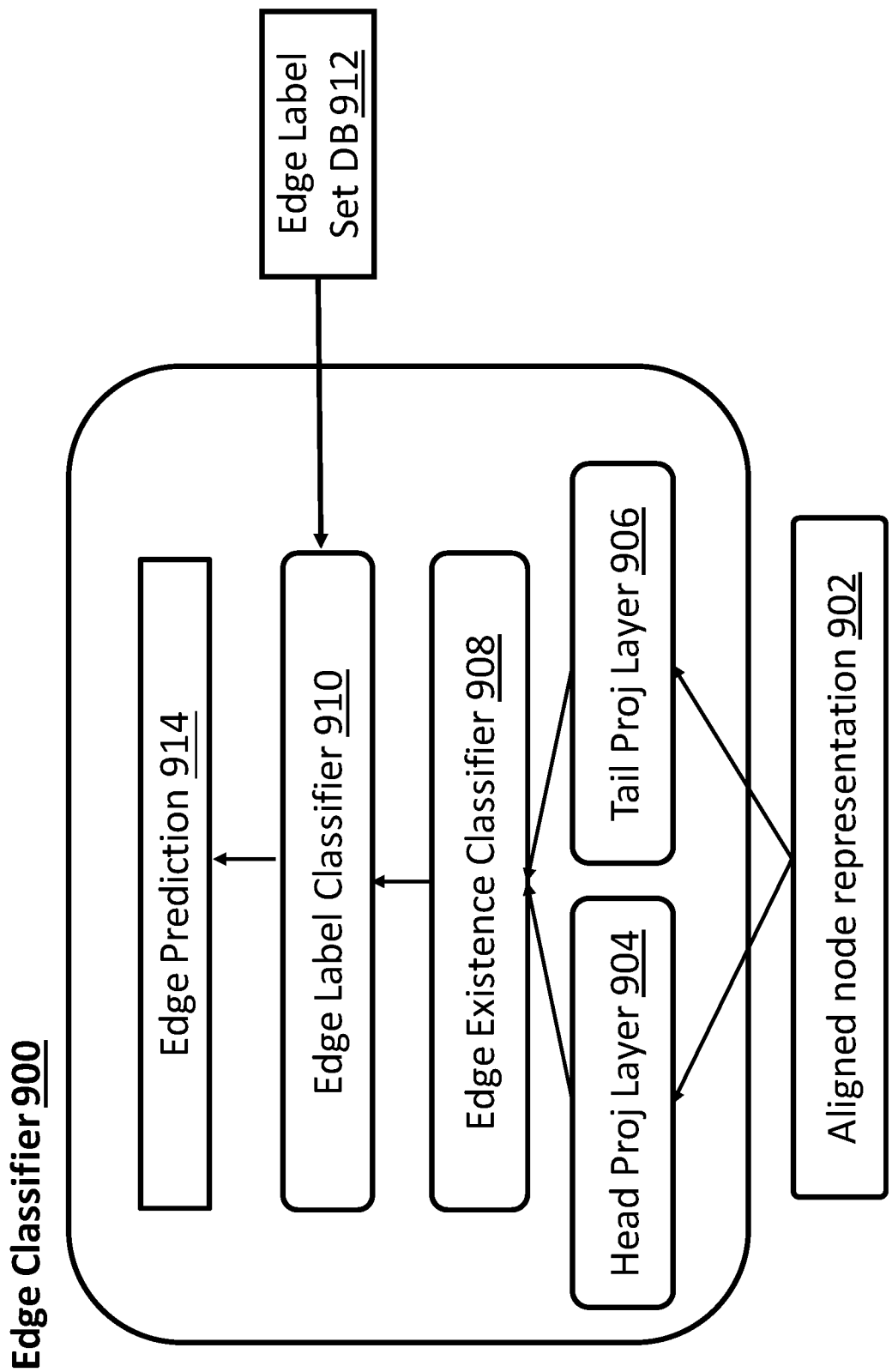
FIG. 9 is a block diagram of an example of an edge classifier, in accordance with an embodiment.

In addition to assigning the node labels, node connectivity and node relations need to be assigned to edges between nodes. To assign edge connectivity and node relations, a hierarchical edge classifier 614 is provided in FIG. 6. The hierarchical edge classifier first determines whether an edge exists and if the edge exists, the label of the edge. FIG. 9 is a block diagram of an example of an edge classifier 900 corresponding to the hierarchical edge classifier 614 of FIG. 6. The hierarchical edge classifier 900 in this example includes a neural network, such as a single-layer or multi-layer Feedforward neural network, for example.

For an edge candidate with a head node and a tail node, a head projection layer 904 transforms the aligned node representation 902 of the head node, and a tail projection layer 906 transforms the representation of the tail node. The transformed representations are used for edge existence and label classification. The output of the head projection layer 904 and the tail projection 906 layer are concatenated and provided to the edge existence classifier 908. The edge existence classifier classifies or determines whether an edge exists between two nodes. If it is determined that an edge exists between two nodes, then the edge label classifier 910 assigns a label to the edge from a set of edge labels 912. The edge label may be assigned from the edge labels in the edge label set 912 in FIG. 9, which corresponds to the edge label set database 222 in FIG. 2. The node edge label is the edge prediction, in block 914, which is the edge label 624 in FIG. 6.

The determination that an edge exists between two nodes is a binary (0, 1), where class 0, 1 corresponds to the case of existent and non-existent edge, respectively. Suppose that the ground truth class is e ($e \in \{0, 1\}$) for a directed edge from one node to another. Since the AMR graph is a directed graph, head and tail nodes are distinguished by applying different projection layers to their representations.

For two nodes j, k, their projected representations are denoted as $h_j^{ext}$ and $t_j^{ext}$, respectively. The projection layer for existence classification may be determined by the head projection layer 904 and the tail projection layer 906, respectively, by an activation function, such as exponential linear unit ("ELU") function in Equations 7, for example:

$$\begin{cases} h_j^{ext} = ELU(P_h^{ext} n_j^{amr} + b_h^{ext}), \\ t_j^{ext} = ELU(P_t^{ext} n_k^{amr} + b_t^{ext}) \end{cases} \quad \text{(Eqns. 7)}$$

In Equations 7, $h_j^{ext}$ a projected head node j's representation for existence classification; $t_k^{ext}$ is a projected tail node k's representation for existence classification; $P_h^{ext}$, $b_h^{ext}$ are projection parameters for head nodes in edge existence; and $P_t^{ext}$, $b_t^{ext}$ are projection parameters for tail nodes in edge existence.

On top of the projected node representations, the edge existence classifier 908 scores class e for the node pair (j, k). Equation 8, below, may be used to score the class $e \in \{0, 1\}$ for a directed edge from node j to node k, for example:

$$s_{j,k}^{ext}(e) = h_j^{ext T} U_e^{ext} t_k^{ext} + (h_j^{ext} \oplus t_k^{ext})^T v_e^{ext}. \quad \text{(Eqn. 8)}$$

In Equation 8, $s_{j,k}^{ext}(e)$ is a score of an existence class e for a directed edge between (j, k). $U_e^{ext}$, $v_e^{ext}$ are trainable class-specific parameters for the class e in the edge existence, from training. $\oplus$ is a concatenation of the two vectors $h_j^{ext}$, $t_k^{ext}$.

The probability of class e can be estimated from the score $s_{j,k}^{ext}(e)$ by Equation 9, for example:

$$p_{j,k}^{ext}(e) = \frac{s_{j,k}^{ext}(e)}{\sum_{e' \in \{0,1\}} s_{j,k}^{ext}(e')} \quad \text{(Eqn. 9)}$$

The probability of class e, $p_{j,k}^{ext}(e)$, is used to determine edge existence based on which has the higher probability, that an edge exists or not. It is also used to determine the training loss during training.

If an edge is determined to exist between two nodes, the node representations of the two nodes are provided to the edge label classifier 910, which identifies the type of edge from the edge label set database 912. The edge label database 912 corresponds to the edge label set database 222 of FIG. 2. The resulting edge prediction 914 includes an identification of the head and tail nodes and the edge label. The edge prediction 914 corresponds to the edge label 624 in FIG. 6.

The assignment of the edge label may be formulated as a multi-class classification to select a label with the highest probability from a set of possible edge labels. If the ground truth label is l, the edge label classifier 910 may calculate a projection layer for label classification by Equations 10, for example:

$$\begin{cases} h_j^{label} = ELU(P_h^{label} n_j^{amr} + b_h^{label}), \\ t_j^{label} = ELU(P_t^{label} n_k^{amr} + b_t^{label}) \end{cases} \quad \text{(Eqns. 10)}$$

In Equations 10, $h_j^{label}$ is a projected head node j's representation for label classification; $t_k^{label}$ is a projected tail node k's representation for label classification; $P_h^{label}$, and $P_t^{label}$ are projection matrices; $b_h^{label}$ and $b_t^{label}$ are bias vectors.

The edge label classifier 910 then takes the projected representations, scores each label l for the edge (j, k), and implements multi-class classification over a label vocabulary set. An edge label l for a directed edge from node j to node k may be determined by the following:

$$s_{j,k}^{label}(l) = h_j^{label^T} U_l^{label} t_k^{label} + (h_j^{label} \oplus t_k^{label})^T v_l^{label} \quad \text{(Eqn. 11)}$$

In Equation 11, $s_j^{label}(l)$ is a score of label class e for a directed edge between (j, k), and $U_l^{label}$ and $v_l^{label}$ are class-specific trainable parameters for class l in the edge label classifier.

The probability of a label from the training set being an edge label l between a respective j and k may be determined by the following equation:

$$p_{j,k}^{label}(l) = softmax(s_{j,k}^{label}(l)) = \frac{s_{j,k}^{label}(l)}{\sum_{l'} s_{j,k}^{label}(l')}. \quad \text{(Eqn. 12)}$$

The label from the edge label set database 912 that has the highest probability is assigned as the edge label by the edge label classifier 910 and becomes the edge prediction 914.

Returning to FIG. 6, the predicted edge label 622 and the predicted edge label 624 of the AMR graph Gamr are provided to a training loss computation block 626. The AMR graph Gamr from the AMR training set 616, which is the ground truth, is also provided to the train loss block 626 for comparison to the predicted edge label 622 and the predicted edge label 624. The output training loss is used as feedback to the graph2graph translation model 608, the node classifier 612, and the hierarchical edge classifier 614 in FIG. 6 to train the parameters of the models to minimize the training loss. The training loss computation is described below.

Training of the node classifier 700 and the edge classifier 900 in the same training model 600 provides improved consistency in input node and edge prediction for the AMR graph.

The AMR generation system 300 of FIG. 3 is trained in the training model 600 of FIG. 6 to maximize L, which is the sum of the node edge likelihood, $L_{node}$, and the edge label likelihood, $L_{edge}$, as shown in Equation 13:

$$L = L_{node} + L_{edge} \quad \text{(Eqn. 13)}$$

The training model 600 estimates the likelihood of ground truth node labels, edge existence class, and edge labels. Let $\mathbb{1}_j^{copy}$ be an indicator function showing whether AMR node j copies from input lemmas. If its label is copied from inputs, then $i_j$ is the lemma index in the input lemmas. Otherwise, let $c_j$ be the abstract concept assigned as the label of node j. The estimated node label likelihood $L_{node}$ may be calculated by Equation 13, for example:

$$L_{node} = \frac{1}{N} \sum_j \left( \mathbb{1}_j^{copy} \cdot q_j^{copy}(i_j) + \left(1 - \mathbb{1}_j^{copy}\right) \cdot q_j^{gen}(c_j) \right) \quad \text{(Eqn. 13)}$$

In Equation 13, N is the number of nodes; $\mathbb{1}_j^{copy}$ is an indicator of whether node j is copied from input; $i_j$ is an input lemma that the node j copies; and $c_j$ is a concept that the node j generates.

As for edges, let $e_{j,k}$ ($e_{j,k} \in \{0, 1\}$) be an indicator reflecting whether a directed edge exists from AMR node j to node k. Suppose that $l_{j,k}$ is the true label of edge (j, k), if the edge exists ($e_{j,k}$=1). The estimated edge likelihood Ledge may be calculated by Equation 14, for example:

$$L_{edge} = \frac{1}{N^2} \sum_j \sum_k (e_{j,k} \cdot p_{j,k}^{ext}(e_{j,k}) + 1 - e_{j,k}) \cdot \quad \text{(Eqn. 14)}$$
$$(1 - p_{j,k}^{ext}(e_{j,k}) + e_{j,k} \cdot p_{j,k}^{label}(l_{j,k}))$$

In Equation 14, $e_{j,k}$, $l_{j,k}$ are ground truths of edge existence and edge label from the AMR graph Gamr from the AMR training set 616 of FIG. 6; $p_{j,k}^{ext}$, $p_{j,k}^{label}$ are edge existence and label probability predicted by the model, respectively.

Example Prediction

The AMR generation system 300 is used during prediction to generate an AMR graph from 314 from an input sentence 302. The graph aligner 618 of FIG. 6 is not needed during prediction because there is no need to align the output graph Gout from the graph2graph translation model 308 with an existing AMR graph Gamr provided from the AMR training set 616, as in FIG. 6. The AMR node classifier 318 and the AMR edge classifier 318 have the same structure and operate in the same manner as the node classifier 700 of FIG. 7 and the hierarchical edge classifier 900 of FIG. 9, as described above, except that during prediction, an output graph Gout 310 is provided to the node classifier 700 and to the hierarchical node classifier 900 instead of the aligned node representation 702. The trained AMR node classifier 700 (318 in FIG. 3) and the trained AMR edge classifier 900 (320 in FIG. 3) then directly predict the node label an edge, respectively. The AMR graph 316 of FIG. 3 is generated based on the predicted nodes and edge labels.

Example Computer Platform

Figure 10:
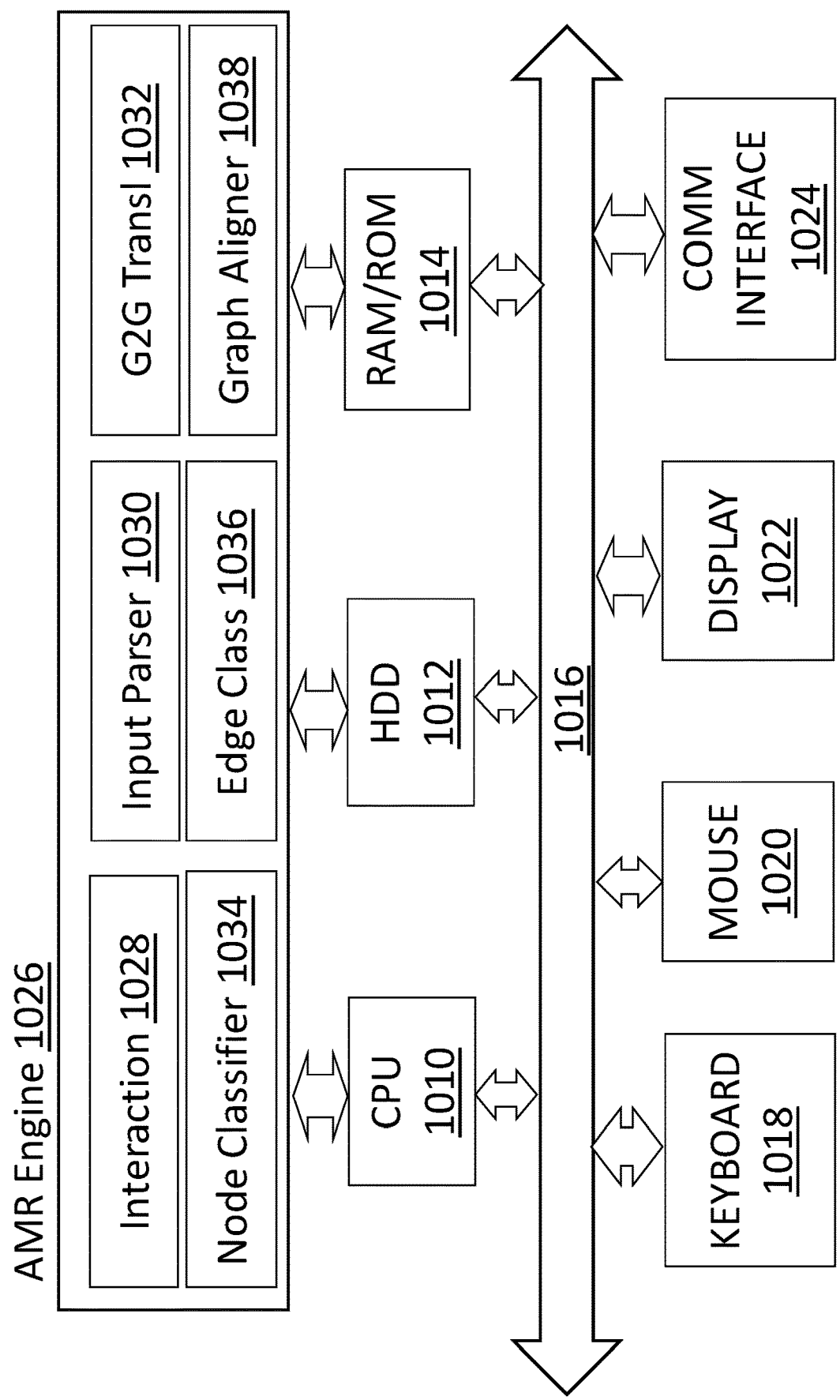
FIG. 10 is an example of a functional block diagram of a computer hardware platform, in accordance with an illustrative embodiment.

Functions relating to the generation of AMR graphs in accordance with embodiments of the disclosure may be performed with the use of one or more computing devices connected for data communication via wireless or wired communication, for example. FIG. 10 is an example of a functional block diagram of a computer hardware platform 1000, such as a network or host computer platform, that may be used to implement an appropriately configured server, such as the AMR server 212 of FIG. 2. Other configurations may be used instead.

The computer platform 1000 may include a processing device, such as a central processing unit (CPU) 1010, a hard disk drive ("HDD") 1012, and random access memory ("RAM") and read only memory ("ROM") 1014, which are connected to a system bus 1016. A keyboard 1018, a mouse 1020, a display 1022, and/or a communication interface 1024, may also be connected to a system bus 1016, for example.

An AMR engine program 1026, which corresponds to AMR engine 214 of FIG. 2, can execute various processes in a manner described herein. The AMR engine program 1026 may be stored in a non-transitory computer readable storage medium, such as the HDD 1012, for example.

The AMR engine program 1026 may have various modules configured to perform different functions. The modules in the AMR engine program 912 may be hardware, software, or a combination of hardware and software, for example. There may be an interaction module 1028 that is operative to receive electronic data from various sources, such as the AMR training set 218, the input lemmas, concept vocabulary database 220, and the edge label set 222 of FIG. 2, for example. The interaction module 1028 may also be operative to receive electronic data, such as input sentences, from various sources, such as the machine translation system 204 and the chatbot system 206 in FIG. 2, for example The interaction module 1026 is also operative to send electronic data, such AMR graphs, to various locations, such as the machine translation system 204 and the chatbot system 206 that provided input sentences to the interaction module.

An input parser module 1030 performs the operations of the input parser 302 in the example of FIG. 3, described above, to parses input sentences 302 into input graphs 306. A graph2graph translation model module 1032 performs the operations of the graph2graph translation model 308 in the example of FIG. 3, described above, to translate input graphs Gin 306 into output graphs Gout 310. A node classifier module 1034 performs the operations of the AMR node classifier 318 of FIG. 3, the node classifier 612 of FIG. 6, and the node classifier 700 of FIG. 7, to copy lemmas or generate abstract concepts for respective nodes of an AMR graph, during training and prediction. An edge classifier module 1036 performs the operations of the AMR edge classifier 318 of FIG. 3, the hierarchical edge classifier 614 of FIG. 6, and the edge classifier 900 of FIG. 9, to determine whether edges exist between nodes and if they do, to classify the label for the respective edges. A graph aligner module 1038 performs the functions of the graph aligner 618 of FIG. 6 to align nodes of the output graph Gout 610 from the graph2graph translation model 608 with nodes of an AMR ground truth graph Gamr during training.

Example Cloud Platform

As discussed above, functions relating to AMR graph generation according to embodiments of the disclosure may be performed in whole or in part in the cloud 216, shown in FIG. 2. It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
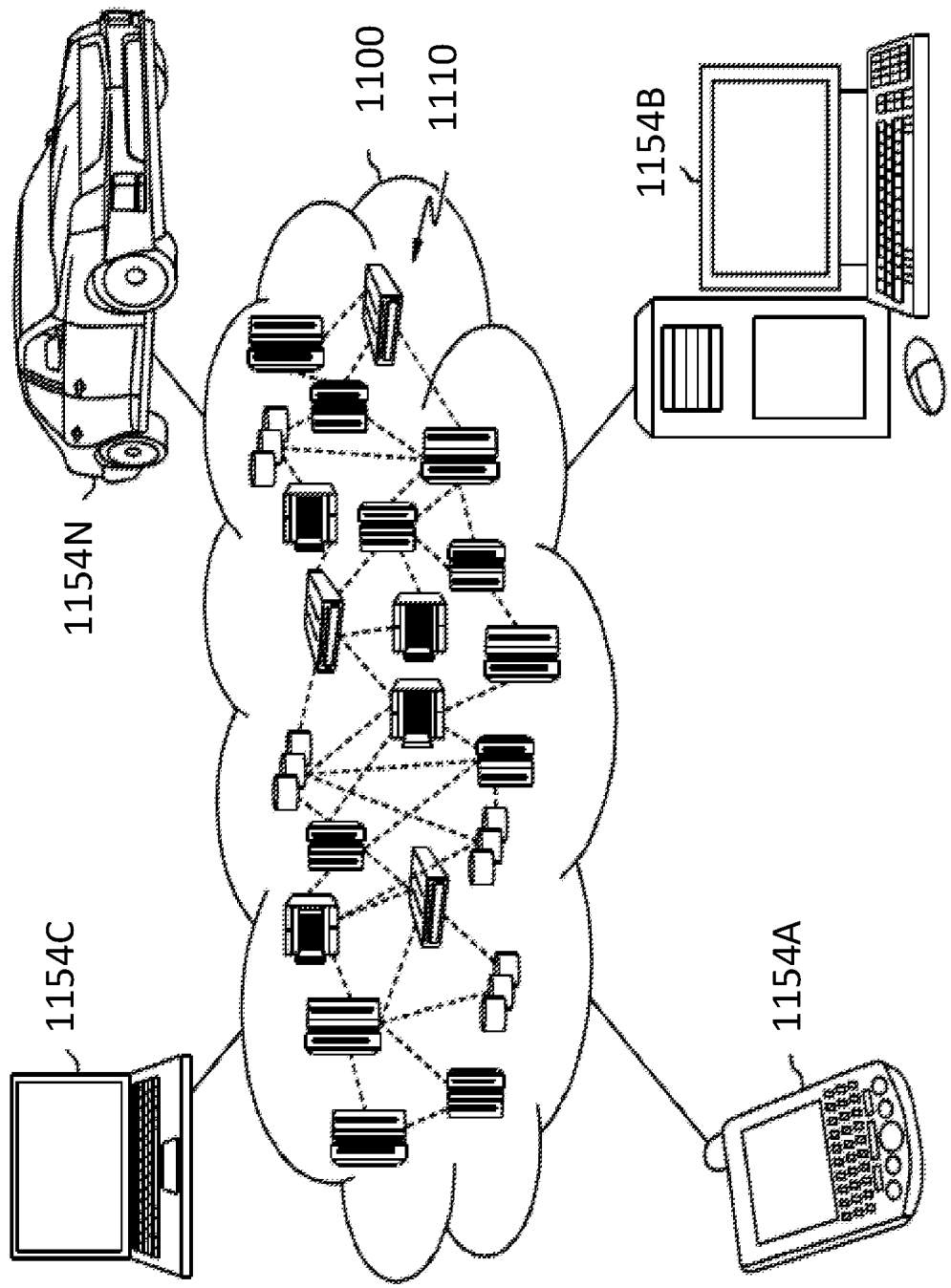
FIG. 11 is an illustrative cloud computing environment, in accordance with an embodiment.

Referring now to FIG. 11, an illustrative cloud computing environment 1100 is depicted. As shown, cloud computing environment 1100 includes one or more cloud computing nodes 1110 with which local computing devices used by cloud consumers, such as, for example, personal digital assistant (PDA) or cellular telephone 1154A, desktop computer 1154B, laptop computer 1154C, and/or automobile computer system 1154N may communicate. Nodes 1110 may communicate with one another. They may be grouped (not shown) physically or virtually, in one or more networks, such as Private, Community, Public, or Hybrid clouds as described hereinabove, or a combination thereof. This allows cloud computing environment 1100 to offer infrastructure, platforms and/or software as services for which a cloud consumer does not need to maintain resources on a local computing device. It is understood that the types of computing devices 1154A-N shown in FIG. 12 are intended to be illustrative only and that computing nodes 1110 and cloud computing environment 1150 can communicate with any type of computerized device over any type of network and/or network addressable connection (e.g., using a web browser).

Figure 12:
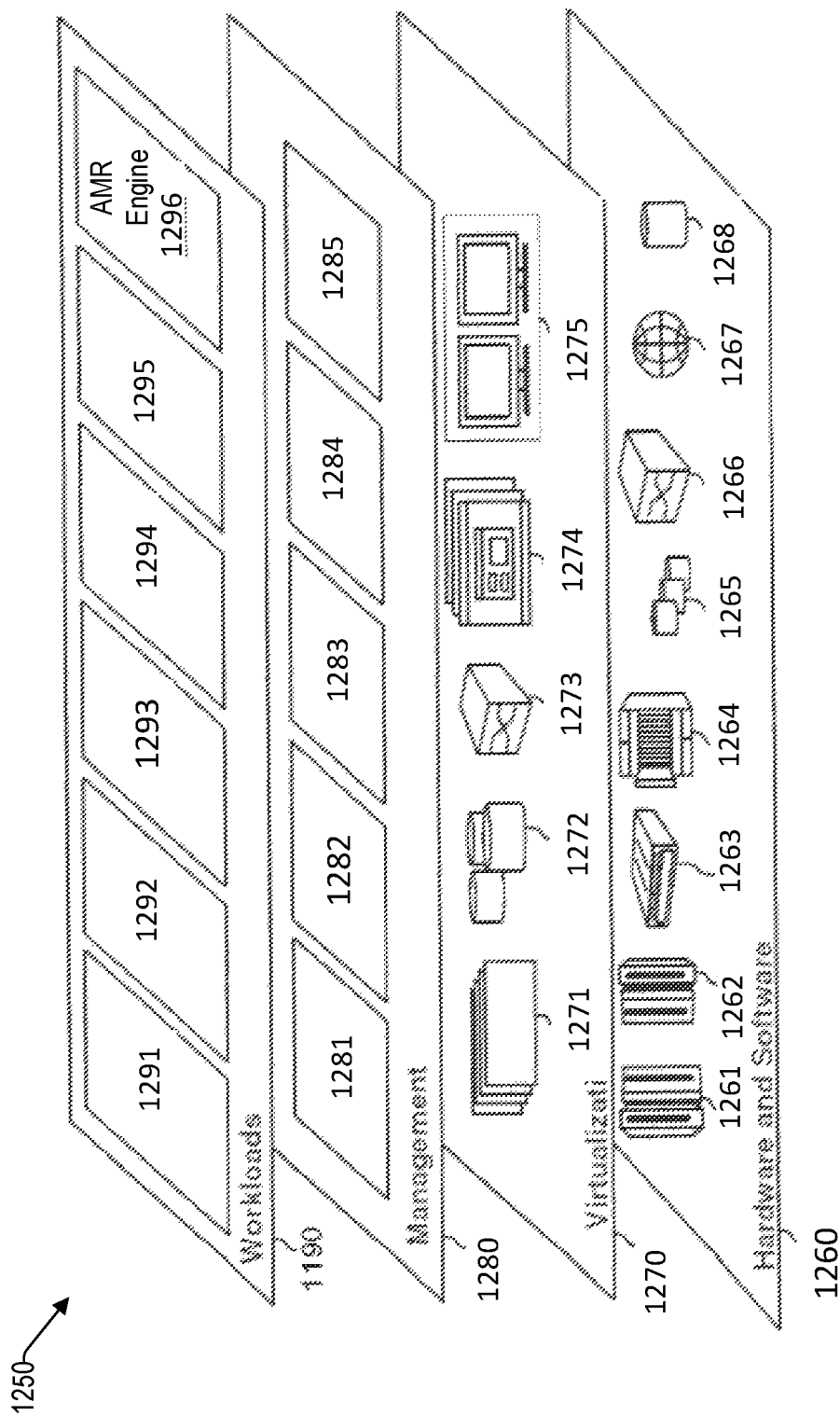
FIG. 12 depicts abstraction model layers, consistent with an illustrative embodiment.

Referring now to FIG. 12, a set of functional abstraction layers provided by cloud computing environment 1250 is shown. It should be understood in advance that the components, layers, and functions shown in FIG. 12 are intended to be illustrative only and embodiments of the disclosure are not limited thereto. As depicted, the following layers and corresponding functions are provided:

Hardware and software layer 1260 includes hardware and software components. Examples of hardware components include: mainframes 1261; RISC (Reduced Instruction Set Computer) architecture based servers 1262; servers 1263; blade servers 1264; storage devices 1265; and networks and networking components 1266. In some embodiments, software components include network application server software 1267 and database software 1268.

Virtualization layer 1270 provides an abstraction layer from which the following examples of virtual entities may be provided: virtual servers 1271; virtual storage 1272; virtual networks 1273, including virtual private networks; virtual applications and operating systems 1274; and virtual clients 1275.

In one example, management layer 1280 may provide the functions described below. Resource provisioning 1281 provides dynamic procurement of computing resources and other resources that are utilized to perform tasks within the cloud computing environment. Metering and Pricing 1282 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1283 provides access to the cloud computing environment for consumers and system administrators. Service level management 1284 provides cloud computing resource allocation and management such that required service levels are met. Service Level Agreement (SLA) planning and fulfillment 1285 provide pre-arrangement for, and procurement of, cloud computing resources for which a future requirement is anticipated in accordance with an SLA.

Workloads layer 1290 provides examples of functionality for which the cloud computing environment may be utilized. Examples of workloads and functions which may be provided from this layer include: mapping and navigation 1291; software development and lifecycle management 1292; virtual classroom education delivery 1293; data analytics processing 1294; transaction processing 1295; and interaction engine 1296, such as the AMR engine 214 of FIG. 2 and the AMR engine 1026 of FIG. 10, for example, to generate an AMR graph based on an input sentence, as discussed herein.

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures herein illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computer-implemented method of generating an abstract meaning representation of a sentence, comprising:
   receiving, by a computing device, an input sentence;
   parsing, by the computing device, the input sentence into one or more syntactic and/or semantic graphs;
   forming, by the computing device, an input graph from the one or more syntactic and/or semantic graphs, the input graph including a node set including words in the one or more input sentences and an edge set including connections between words from the one or more syntactic and/or semantic graphs;
   generating, by the computing device, node representations of the words in the node set by natural language processing;
   predicting, by the computing device, learned node representations aligned with the node representations in the input graph based on the generated node representations and the edge set, via a first neural network;
   predicting, by the computing device, node labels in an output graph via a second neural network, based on the learned node representations, by:
   determining, based on the learned node representation, whether to copy a lemma from a set of lemmas or to generate the abstract concept from a concept library based on a probability to copy a lemma and the probability to generate the abstract idea, by the second neural network; and predicting the lemma to copy or the abstract idea to generate based on the lemma in the set of lemmas or the abstract concept from the concept vocabulary that has a highest probability of being the predicted node label, by the second neural network;

predicting, by the computing device, edge labels in the output graph, via a third neural network, based on the learned node representations; and generating, by the computing device, an abstract meaning representation graph of the input sentence, the abstract meaning representation graph having nodes with node labels based on the predicted node labels and edges between nodes based on the predicted edge labels.

2. The method of claim 1, wherein the one or more syntactic and/or semantic graphs is a constituency graph and a dependency graph; and the method further comprising merging the constituency graph and the dependency graph in the node set and the edge set.

3. The method of claim 1, wherein the first neural network comprises a graph neural network having convolution layers and de-convolution layers.

4. The method of 1, further comprising predicting an edge label by the third neural network by:

predicting whether an edge exists between the pair of nodes; and if an edge is predicted to exist between the pair of nodes, classifying an edge label from a set of edge labels having a highest probability of being the edge label for the edge.

5. The method of claim 1, further comprising:

receiving the input sentence from a second computing device; and providing the generated abstract meaning relation graph to the second computing device.

6. The method of claim 1, further comprising:

training the first, second, and third neural networks by:

providing an input sentence corresponding to a respective AMR graph in a training set to the input parser;

aligning nodes in the output graph with nodes in the abstract meaning representation graph of a training set;

comparing provided AMR graphs with predicted AMR graphs; and updating parameters in the first neural network, the second neural network, and the third neural network to minimize training loss.

7. A computing device comprising:

a processing device;

a network interface coupled to the processing device to enable communication over a network;

a storage device coupled to the processing device;

abstract meaning relationship graphing code stored in the storage device, wherein an execution of the code by the processing device causes the computing device to:

parse an input sentence into one or more syntactic and/or semantic graphs;

form an input graph from the one or more syntactic and/or semantic graphs, the input graph having a node set including words in the one or more input sentences and an edge set including connections between words from the one or more syntactic and/or semantic graphs;

generate node representations of the words in the node set by natural language processing;

predict learned node representations aligned with the node representations in the input graph based on the generated node representations and the edge set, via a first neural network;

predict, by the computing device, node labels in an output graph, via a second neural network, based on the learned node representations, by:

determining, based on the learned node representation, whether to copy a lemma from a set of lemmas or to generate the abstract concept from a concept library based on a probability to copy a lemma and the probability to generate the abstract idea, by the second neural network; and predicting the lemma to copy or the abstract idea to generate based on the lemma in the set of lemmas or the abstract concept from the concept vocabulary that has a highest probability of being the predicted node label, by the second neural network;

predict, by the computing device, edge labels in the output graph, via a third neural network, based on the learned node representations; and generate the abstract meaning representation graph of the input sentence, the abstract meaning representation graph having nodes with node labels based on the predicted node labels and edges between nodes based on the predicted edge labels.

8. The computing device of claim 7, wherein the one or more syntactic and/or semantic graphs is a constituency graph and a dependency graph, and the abstract meaning relationship graphing code further causes the computing device to:

merge the constituency graph and the dependency graph in the node set and the edge set.

9. The computing device of claim 7, wherein the first neural network comprises a graph neural network having convolution layers and de-convolution layers.

10. The computing device of claim 7, wherein the abstract meaning relationship graphing code further causes the computing device to predict an edge label by the third neural network by:

predicting whether an edge exists between the pair of nodes; and if an edge is predicted to exist between the pair of nodes, classifying an edge label from a set of edge labels having a highest probability of being the edge label for the edge.

11. The computing device of claim 7, wherein the input sentence is received from a second computing device and the abstract meaning relationship graphing code further causes the computing device to:

provide the generated abstract meaning relation graph to the second computing device.

12. The computing device of claim 7, wherein the abstract meaning relationship graphing code further causes the computing device to:

train the first, second, and third neural networks by:

providing an input sentence corresponding to a respective AMR graph in a training set to the input parser;

aligning nodes in the output graph with nodes in the abstract meaning representation graph of a training set;

comparing the provided abstract meaning representation graph with the predicted abstract meaning representation graph; and updating parameters in the first neural network, the second neural network, and the third neural network to minimize training loss.

13. A non-transitory computer readable storage medium tangibly embodying a computer readable program code having computer readable instructions that, when executed, causes a computing device to generate an abstract meaning relationship graph from an input sentence by:
- parsing, by the computing device, the input sentence into one or more syntactic and/or semantic graphs;
- forming an input graph from the one or more syntactic and/or semantic graphs, the input graph having a node set including words in the one or more input sentences and an edge set including connections between words from the one or more syntactic and/or semantic graphs;
- generating node representations of the words in the node set by natural language processing;
- predicting learned node representations aligned with the node representations in the input graph based on the generated node representations and the edge set, via a first neural network;
- predicting, by the computing device, node labels in an output graph, via a second neural network, based on the learned node representations, by:
  - determining, based on the learned node representation, whether to copy a lemma from a set of lemmas or to generate the abstract concept from a concept library based on a probability to copy a lemma and the probability to generate the abstract idea, by the second neural network; and
  - predicting the lemma to copy or the abstract idea to generate based on the lemma in the set of lemmas or the abstract concept from the concept vocabulary that has a highest probability of being the predicted node label, by the second neural network;
- predicting, by the computing device, edge labels in the output graph, via a third neural network, based on the learned node representations; and
- generating the abstract meaning representation graph of the input sentence, the abstract meaning representation graph having nodes with node labels based on the predicted node labels and edges between nodes based on the predicted edge labels.

14. The non-transitory computer readable storage medium of claim 13, wherein the one or more syntactic and/or semantic graphs is a constituency graph and a dependency graph; and
- the computer readable instructions, when executed, further causes the computing device to merge the constituency graph and the dependency graph in the node set and the edge set.

15. The non-transitory computer readable storage medium of claim 13, wherein the first neural network comprises a graph neural network having convolution layers and de-convolution layers.

16. The non-transitory computer readable storage medium of claim 13, wherein the computer readable instructions, when executed, further causes the computing device to predict an edge label by the third neural network by:
- predicting whether an edge exists between the pair of nodes; and
- if an edge is predicted to exist between the pair of nodes, classifying an edge label from a set of edge labels having a highest probability of the edge label for the edge.

17. The non-transitory computer readable storage medium of claim 13, wherein the input sentence is provided by a second computing device and the computer readable instructions, when executed, further causes the computing device to:
- provide the generated abstract meaning relation graph to the second computing device.

* * * * *